(12) United States Patent  
Min

(10) Patent No.: US 11,194,189 B2  
(45) Date of Patent: Dec. 7, 2021

(54) DISPLAY APPARATUS

(71) Applicant: SAMSUNG ELECTRONICS CO., LTD., Suwon-si (KR)

(72) Inventor: Kwan Sik Min, Gunpo-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/768,782

(22) PCT Filed: Aug. 30, 2018

(86) PCT No.: PCT/KR2018/010075  
§ 371 (c)(1),  
(2) Date: Jun. 1, 2020

(87) PCT Pub. No.: WO2019/107711  
PCT Pub. Date: Jun. 6, 2019

(65) Prior Publication Data  
US 2021/0173253 A1   Jun. 10, 2021

(30) Foreign Application Priority Data

Nov. 30, 2017 (KR) .................. 10-2017-0162702

(51) Int. Cl.  
*G02F 1/1335* (2006.01)  
*G02F 1/13357* (2006.01)  
(52) U.S. Cl.  
CPC .. *G02F 1/133514* (2013.01); *G02F 1/133603* (2013.01); *G02F 1/133605* (2013.01); *G02F 1/133607* (2021.01)

(58) Field of Classification Search  
CPC ................................. G02F 1/133514  
See application file for complete search history.

(56) References Cited

U.S. PATENT DOCUMENTS

| 10,101,612 | B2 | 10/2018 | Im et al. | |
| 2011/0194059 | A1* | 8/2011 | Yamazaki | G02F 1/1368 |
| | | | | 349/138 |
| 2014/0307417 | A1* | 10/2014 | Yamakawa | F21V 1/17 |
| | | | | 362/84 |
| 2016/0070137 | A1* | 3/2016 | You | G02F 1/133603 |
| | | | | 349/71 |

(Continued)

FOREIGN PATENT DOCUMENTS

| KR | 10-2015-0040608 A | 4/2015 |
| KR | 10-2016-0094343 A | 8/2016 |

(Continued)

OTHER PUBLICATIONS

International Search Report (PCT/ISA/210) dated Dec. 17, 2018 issued by the International Searching Authority in counterpart International Application No. PCT/KR2017/010075.

(Continued)

*Primary Examiner* — Edmond C Lau  
(74) *Attorney, Agent, or Firm* — Sughrue Mion, PLLC

(57) ABSTRACT

Disclosed herein is a display apparatus. The display apparatus includes a display panel having a quantum dot color filter and an absorption type color filter disposed in front of the quantum dot color filter, a backlight unit configured to supply light to the display panel, and a quantum dot sheet disposed between the display panel and the backlight unit.

13 Claims, 8 Drawing Sheets

(56) References Cited

U.S. PATENT DOCUMENTS

| | | | |
|---|---|---|---|
| 2016/0085118 A1* | 3/2016 | Lee | G02F 1/29 |
| | | | 349/62 |
| 2016/0170262 A1* | 6/2016 | Saneto | G02B 6/005 |
| | | | 349/71 |
| 2017/0102588 A1 | 4/2017 | Im et al. | |

FOREIGN PATENT DOCUMENTS

| | | |
|---|---|---|
| KR | 10-2017-0002149 A | 1/2017 |
| KR | 10-2017-0043724 A | 4/2017 |
| KR | 10-2017-0096583 A | 8/2017 |

OTHER PUBLICATIONS

Written Opinion (PCT/ISA/237) dated Dec. 17, 2018 issued by the International Searching Authority in counterpart International Application No. PCT/KR2017/010075.

* cited by examiner

DISPLAY APPARATUS

TECHNICAL FIELD

The present disclosure relates to a display apparatus, and more particularly, to a display apparatus capable of improving brightness and a contrast ratio.

BACKGROUND ART

A display apparatus is an output apparatus for visually displaying images and data information, such as characters, figures, and the like.

The display apparatus includes a self-emitting display panel such as an Organic Light-Emitting Diode (OLED) panel, or a light-receiving display panel such as a Liquid Crystal Display (LCD) panel.

A display apparatus to which a light-receiving display panel is applied includes a backlight unit for supplying light to the display panel.

A display apparatus including a light-receiving display panel, specifically, a display apparatus including an LCD panel includes blue, green, and red color filters assigned to pixels. When light emitted from the backlight unit passes through the color filters of the pixels, the light is absorbed by the color filters except for colors corresponding to the color filters of the respective pixels. Through this process, blue, green, and red colors are displayed on a screen.

When the color filters are replaced with a quantum dot material for converting light into a specific color, and a light source emitting blue light is applied thereto, light passing through the quantum dot material can be converted into the specific color, which improves the efficiency of the display apparatus, unlike conventional color filters. Also, since the converted light is emitted in all directions, the side visibility of the display apparatus is improved.

However, in the case of the LCD, light leakage is more serious at both sides than at the center, and the light leakage reduces the contrast ratio.

DISCLOSURE

Technical Problem

Therefore, it is an aspect of the present disclosure to provide a display apparatus capable of improving brightness and a contrast ratio.

Technical Solution

In accordance with an aspect of the present disclosure, a display apparatus includes a display panel having a quantum dot color filter and an absorption type color filter disposed in front of the quantum dot color filter, a backlight unit to supply light to the display panel, and a quantum dot sheet disposed between the display panel and the backlight unit.

The backlight unit may include a light source to emit blue light.

The display apparatus may further include a prism sheet disposed in front of the quantum dot sheet and configured to enhance a degree of light condensation of light emitted from the quantum dot sheet.

The display apparatus may further include a reflective polarizing member disposed between the display panel and the quantum dot sheet.

The display apparatus may further include an optical shutter disposed between the display panel and the quantum dot sheet and configured to improve a contrast ratio.

The optical shutter may include a shutter polarizing filter disposed adjacent to the quantum dot sheet, a first shutter substrate disposed in front of the shutter polarizing filter, a shutter liquid crystal layer disposed in front of the first shutter substrate, and a second shutter substrate disposed in front of the shutter liquid crystal layer.

The display apparatus may further include a surface treatment layer disposed in front of the absorption type color filter for reducing surface reflection due to external light.

The display panel may include a panel liquid crystal layer and a front polarizing filter disposed in front of the panel liquid crystal layer, and the quantum dot color filter may be disposed in contact with a front surface of the front polarizing filter.

The backlight unit may include a light source, a light guide plate provided to guide light generated from the light source toward the display panel, and a reflection sheet disposed behind the light guide plate.

The quantum dot sheet may be configured to output both red light, green light, and configured to output blue light the most.

In accordance with another aspect of an example embodiment, a display apparatus includes a display panel having a quantum dot color filter and an absorption type color filter disposed in front of the quantum dot color filter, and a backlight unit having a light source configured to output white light and configured to output blue light the most.

The display apparatus may further include an optical shutter disposed between the display panel and the backlight unit and configured to improve a contrast ratio.

The optical shutter may include a shutter polarizing filter disposed adjacent to the backlight unit, a first shutter substrate disposed in front of the shutter polarizing filter, a shutter liquid crystal layer disposed in front of the first shutter substrate, and a second shutter substrate disposed in front of the shutter liquid crystal layer.

The display apparatus may further include a prism sheet disposed in front of the backlight unit and configured to enhance a degree of light condensation of light emitted from the backlight unit.

The display apparatus may further include a reflective polarizing member disposed between the display panel and the backlight unit.

The display apparatus may further include a surface treatment layer disposed in front of the absorption type color filter for reducing surface reflection due to external light.

The display panel may include a panel liquid crystal layer and a front polarizing filter disposed in front of the panel liquid crystal layer, and the quantum dot color filter may be disposed in contact with a front surface of the front polarizing filter.

The backlight unit may include a light guide plate provided to guide light generated from the light source toward the display panel, and a reflection sheet disposed behind the light guide plate.

In accordance with still another aspect of an example embodiment, a display apparatus includes a display panel having a quantum dot color filter and an absorption type color filter disposed in front of the quantum dot color filter, a backlight unit having a light source emitting blue light, a quantum dot sheet disposed between the display panel and the backlight unit, a prism sheet disposed in front of the quantum dot sheet and configured to improve a degree of light condensation of light emitted from the backlight unit, and an optical shutter disposed between the prism sheet and the display panel and configured to improve a contrast ratio.

The display apparatus may further include a reflective polarizing member disposed between the optical shutter and the prism sheet.

Advantageous Effects

According to a technical concept of the present disclosure, the display apparatus may improve brightness and a contrast ratio by disposing the quantum dot sheet between the display panel and the backlight unit.

MODES OF THE INVENTION

Figure 1:
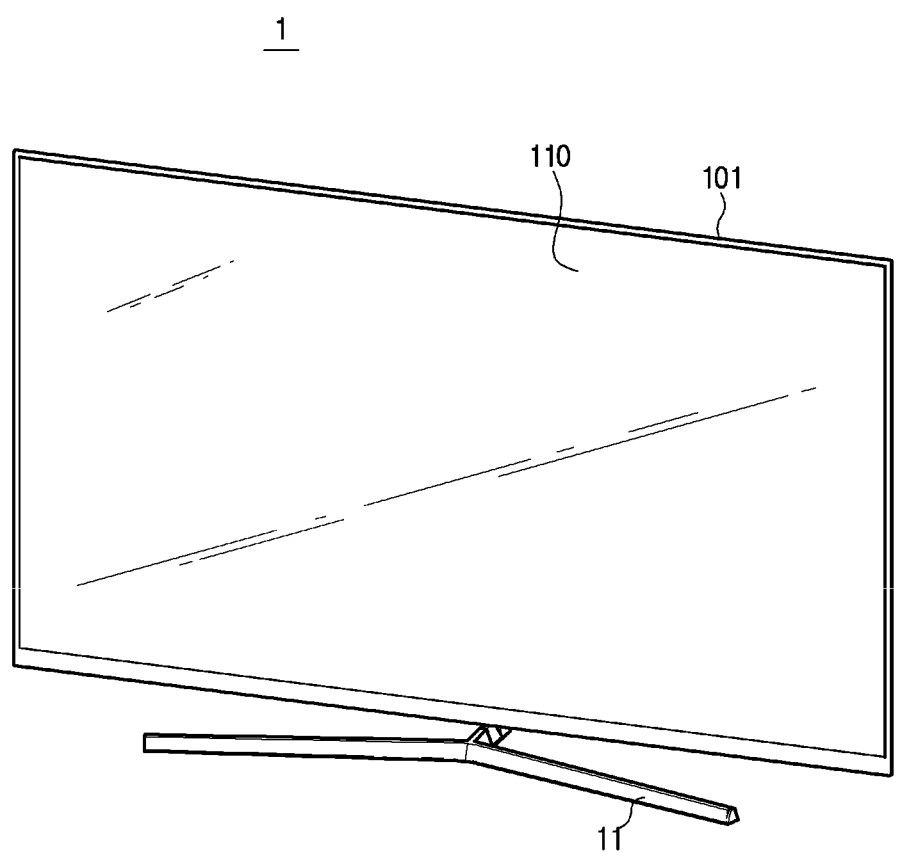
FIG. 1 shows a display apparatus according to an embodiment of the present disclosure.

Like numbers refer to like elements throughout this specification. This specification does not describe all components of the embodiments, and general information in the technical field to which the present disclosure belongs or overlapping information between the embodiments will not be described.

It will be understood that when a component is referred to as being "connected" to another component, it can be directly or indirectly connected to the other component. When a component is indirectly connected to another component, it may be connected to the other component through a wireless communication network.

Also, it will be understood that when the terms "includes," "comprises," "including," and/or "comprising," when used in this specification, specify the presence of a stated component, but do not preclude the presence or addition of one or more other components.

In the entire specification, it will also be understood that when an element is referred to as being "on" or "over" another element, it can be directly on the other element or intervening elements may also be present.

It will be understood that, although the terms first, second, etc. may be used herein to describe various components, these components should not be limited by these terms. These terms are only used to distinguish one component from another.

It is to be understood that the singular forms "a," "an," and "the" include plural referents unless the context clearly dictates otherwise.

Reference numerals used in operations are provided for convenience of description, without describing the order of the operations, and the operations can be executed in a different order from the stated order unless a specific order is definitely specified in the context.

Hereinafter, the operation principle and embodiments of the present disclosure will be described with reference to the accompanying drawings.

FIG. 1 shows a display apparatus according to an embodiment of the present disclosure.

A display apparatus 1 may be used to display information, materials, data, etc. in the form of characters, figures, graphs, and images, The display apparatus 1 may include a television which is telecommunication medium for transmitting moving images and image signals, and a monitor which is a kind of computer output device.

The display apparatus 1 may be a flat display apparatus having a flat screen as shown in FIG. 1, a curved surface display apparatus having a curved screen, or a bendable display apparatus that can change a flat screen to a curved screen or the curved screen to the flat screen.

The display apparatus 1 may include a display panel 110 for displaying images, and a backlight unit 130 for supplying light to the display panel 110.

The display apparatus 1 may further include a leg 11 for supporting the display apparatus 1 on an installation surface. The display apparatus 1 may be supported on the floor, as shown in FIG. 1. Also, the display apparatus 1 may be hung on a wall, or installed in the inside of a wall in a built-in manner, unlike the embodiment shown in FIG. 1.

Figure 2:
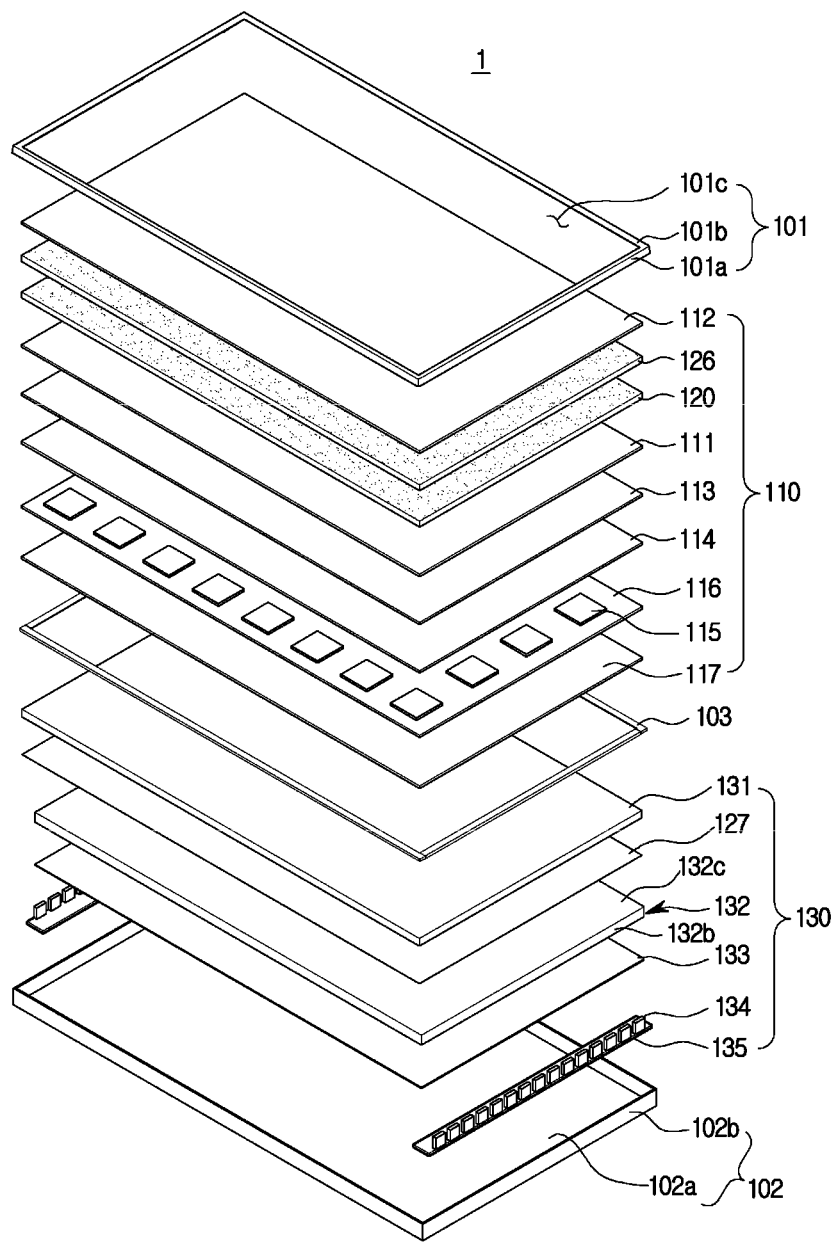
FIG. 2 is an exploded perspective view of the display apparatus shown in FIG. 1.
Figure 3:
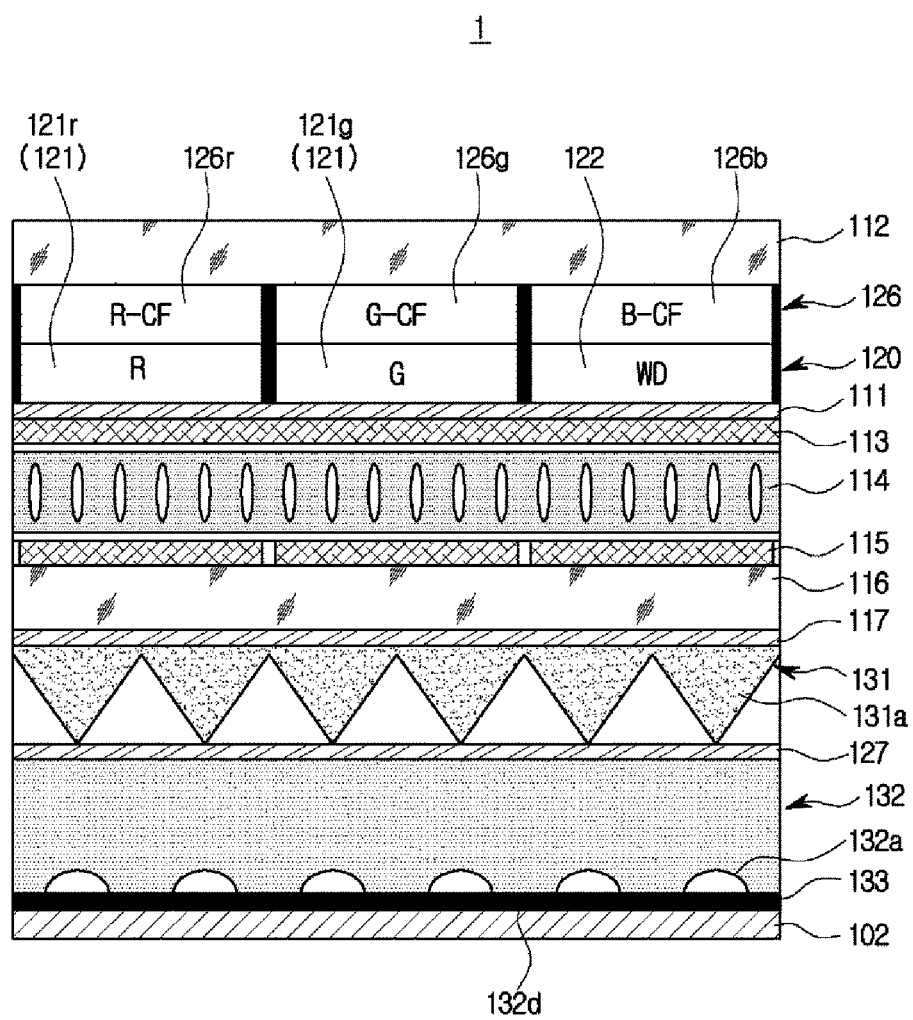
FIG. 3 is a cross-sectional view of the display apparatus shown in FIG. 1.

FIG. 2 is an exploded perspective view of the display apparatus shown in FIG. 1, and FIG. 3 is a cross-sectional view of the display apparatus shown in FIG. 1.

As shown in FIGS. 2 and 3, the display apparatus 1 may include a chassis assembly for accommodating the display panel 110 and the backlight unit 130 and supporting them.

The chassis assembly may include a top chassis 101, a middle mold 103, and a bottom chassis 102.

The top chassis 101 may include an opening 101c for exposing the display panel 110, a bezel portion 101b for supporting an upper edge portion of the display panel 110, and a top chassis side portion 101a extending downward from the bezel portion 101b.

The bottom chassis 102 may include a bottom portion 102a disposed below the backlight unit 130, and a bottom side portion 102b extending upward from the bottom portion 102a.

Various components of the display apparatus 1, such as the top chassis 101 and the middle mold 103, may be fixedly supported on the bottom chassis 102.

The bottom chassis 102 may dissipate heat generated from a light source 134 to the outside. That is, heat generated from the light source 134 may be transferred to the bottom chassis 102 through a light source substrate 135, and then dissipated from the bottom chassis 102. The bottom chassis 102 may be formed of various metal materials, such as aluminum and steel use stainless (SUS), having high heat conductivity, or a plastic material such as acrylonitrile butadiene styrene (ABS). Also, the light source substrate 135 may be a metal Printed Circuit Board (PCB) made of an aluminum material having high heat conductivity.

However, unlike the current embodiment, at least one of the top chassis 101, the middle mold 103, and the bottom chassis 102 may be omitted, or two or more of the top chassis 101, the middle mold 103, and the bottom chassis 102 may be integrated into one body.

The display apparatus 1 may further include a housing (not shown) for accommodating the chassis assembly and protecting it.

The display apparatus 1 may further include the backlight unit 130 for supplying light to the display panel 110.

The backlight unit 130 may be an edge type in which a light source is disposed on at least one side of a plurality of longer sides and a plurality of shorter sides of a display panel, like the current embodiment, or a direct type in which a light source is disposed immediately below a display panel, unlike the current embodiment.

The backlight unit 130 may include a light source module including the light source 134 and the light source substrate 135 on which the light source 134 is mounted, and various optical members disposed on a path of light emitted from the light source 134.

The light source 134 may supply light to the display panel 110. The light source 134 may include a light emitting diode (LED). The LED may be provided in the form of a package in which an LED chip is mounted on a substrate and filled with a resin. However, unlike the current embodiment, a cold cathode fluorescent lamp (CCFL) or an external electrode fluorescent lamp (EEFL) may be used as a light source.

The light source 134 may emit light of a predetermined color in all directions. Herein, the light of the predetermined color may include blue light. Blue light may have a wavelength from about 400 nm to 500 nm, and look blue. The light source 134 may be implemented with a blue light emitting diode in order to emit blue light.

A plurality of light sources 134 may be mounted on the light source substrate 135 in a line along the edges of the display panel 110. The light source substrate 135 may be provided with a circuit pattern to transmit driving power and signals to the light source 134. The light source substrate 135 may be rested on the bottom chassis 102.

The optical members may be disposed on the path of light emitted from the light source 134 to guide a traveling direction of the light or to improve the optical characteristics.

The optical members may include a light guide plate 132 for uniformly dispersing light emitted from the light source 134 toward the display panel 110. The light guide plate 132 may guide the light emitted from the light source 134 to the display panel 110.

The light guide plate 132 may be made of poly methyl methacrylate acrylate (PMMA). The light guide plate 132 may be provided with a pattern 132a (see FIG. 3) for changing the light path. In an edge type backlight unit like the current embodiment, the light source 134 may be positioned along a side surface of the light guide plate 132. Light incident to the side surface of the light guide plate 132 may be scattered by the pattern 132a formed on a bottom surface of the light guide plate 132, and then exit the light guide plate 132 at the upper surface.

In another aspect, the light guide plate 132 may include an incident surface 132b onto which light emitted from the light source 134 is incident, and an exit surface 132c at which light incident to the light guide plate 132 exits toward the display panel 110. Also, the light guide plate 132 may further include an exit corresponding surface 132d that is opposite to the exit surface 132c of the light guide plate 132. The pattern 132a may be formed on the exit corresponding surface 132d to guide light incident to the incident surface 132b of the light guide plate 132 to the exit surface 132c of the light guide plate 132. The pattern 132a may be in the shape of a convex lens that is convex toward the exit surface 132c of the light guide plate 132.

The light guide plate 132 may be rested on a reflection sheet 133. The light guide plate 132 may be disposed such that the side surface of the light guide plate 132 is spaced a predetermined distance apart from the light source 134 in consideration of thermal expansion.

The optical members may further include various optical sheets for improving the optical characteristics. The optical sheets may be disposed on the light guide plate 132 to improve the optical characteristics of light exiting the light guide plate 132.

The optical sheets may include a diffuser sheet (not shown). The diffusion sheet may cancel or minimize the pattern 132a of the light guide plate 132. Since light guided through the light guide plate 132 directly enters a user's eyes, the pattern 132a of the light guide plate 132 may reflect as it is on the user's eyes. Therefore, the diffusion sheet may be used to cancel or minimize the pattern 132a.

The optical sheets may further include a prism sheet 131. The prism sheet 131 may improve light brightness by concentrating light whose brightness has deteriorated sharply when passing through the diffusion sheet. In another aspect, the prism sheet 131 may be disposed on the light guide plate 132 to refract light exiting the exit surface 132c of the light guide plate 132. The prism sheet 131 may include a plurality of prisms 131a protruding toward the exit surface 132c of the light guide plate 132.

The optical sheets may further include a protection sheet (not shown) for protecting the optical sheets from an external impact or foreign materials.

The optical sheets may include all of the diffusion sheet, the prism sheet 131, and the protection sheet, as described above, may include one or more of the diffusion sheet, the prism sheet 131, and the protection sheet, or may further include one or more other sheets in addition to the diffusion sheet, the prism sheet 131, and the protection sheet. Further, the optical sheets may be formed as a composite sheet having the functions of the individual sheets.

The optical members may further include a reflector sheet 133 for reflecting light to prevent light loss. The reflector sheet 133 may reflect light emitted from the light source 134 to cause the light to be incident onto the exit corresponding surface 132d of the light guide plate 132. The reflector sheet 133 may be formed in various shapes, such as a sheet, a film, and a plate. For example, the reflector sheet 133 may be formed by coating a base material with a material having high reflectance. The base material may be SUS, BRASS, aluminum, polyethylene terephthalate (PET), etc. and the high reflective coating material may be silver, titanium dioxide ($TiO_2$), etc. The reflector sheet 133 may be rested on the light source substrate 135, and supported thereon.

The display apparatus 1 may include a quantum dot sheet 127 disposed between the light guide plate 132 and the optical sheet. The quantum dot sheet 127 may change the color of light emitted through the light guide plate 132. Since the light source 134 emits blue light in the current embodiment, the quantum dot sheet 127 may receive light from the light guide plate 132, and output white light (light in which various colors of light (red light, green light, and blue light) are mixed). The blue light emitted from the quantum dot sheet 127 may be the same as the blue light provided to the quantum dot sheet 127. Green light and red light exiting the quantum dot sheet 127 may be light converted by absorbing blue light in a part of the quantum dot sheet 127.

The quantum dot sheet 127 may control red light, green light, and blue light to a desired ratio by changing the composition, size, and mixing ratio of quantum dots, and accordingly, the display apparatus 1 may obtain white light capable of realizing excellent color reproducibility and color purity. In the current embodiment, the quantum dot sheet 127 may emit white light having a high ratio of blue light by controlling the density of quantum dots. In the current embodiment, the quantum dot sheet 127 may emit white light having a high proportion of blue light by adjusting the thickness of the sheet.

The display apparatus 1 may further include the display panel 110 for displaying images.

The display panel 110 may include a panel liquid crystal layer 114. The panel liquid crystal layer 114 may display images using a liquid crystal exhibiting optical properties in accordance with changes in voltage and temperature. The panel liquid crystal layer 114 may be disposed between a first electrode 115 and a second electrode 113, and may include a plurality of liquid crystal molecules. The liquid crystal molecules may be arranged in a plurality of rows in the panel liquid crystal layer 114. The liquid crystal molecules may be arranged in a line in a predetermined direction or spirally twisted according to an electric field.

The display panel 110 may further include a rear polarizing filter 117 onto which light transmitted through the optical sheets is incident. The middle mold 103 may be disposed between the optical sheets and the rear polarizing filter 117. The middle mold 103 may fix the backlight unit 130, or may partition the display panel 110 from the backlight unit 130.

The rear polarizing filter 117 may polarize light that is incident onto a first substrate 116 from the light source 134 so as to cause light vibrating in the same direction as a predetermined polarization axis to be incident onto the first substrate 116. One surface of the rear polarizing filter 117 may be in contact with the first substrate 116. Alternatively, the rear polarizing filter 117 may be disposed adjacent to the first substrate 116. The rear polarizing filter 117 may be in the form of a film. For example, the rear polarizing filter 117 may be a vertical polarizing filter or a horizontal polarizing filter.

The display panel 110 may further include the first substrate 116. The first substrate 116 may be disposed on the rear polarizing filter 117. The first electrode 115 may be disposed on one surface of the first substrate 116. Specifically, the first electrode 115 may be disposed on one surface of the first substrate 116 facing the panel liquid crystal layer 114. The first substrate 116 may be formed of a transparent material to transmit light passed through the rear polarizing filter 117. For example, the first substrate 116 may be formed of a synthetic resin such as acryl or glass. Also, the first substrate 116 may be implemented in the form of a flexible printed circuit board (FPCB).

The first electrode 115 may apply a current to the panel liquid crystal layer 114 together with the second electrode 113 which will be described later to control the arrangement of the liquid crystal molecules in the panel liquid crystal layer 114. The display panel 110 may output various images according to the arrangement of the liquid crystal molecules.

The first electrode 115 may be implemented using a thin film transistor (TFT). The first electrode 115 may be connected to an external power source to receive power. A plurality of first electrodes 115 may be provided on the first substrate 116.

The display panel 110 may further include the second electrode 113. The second electrode 113 may face the first electrode 115 with the panel liquid crystal layer 114 in between. The second electrode 113 may apply a current to the panel liquid crystal layer 114 together with the first electrode 115. A front polarizing filter 111 may be disposed on the second electrode 113. In other words, the second electrode 113 may be disposed between the front polarizing filter 111 and the panel liquid crystal layer 114. The second electrode 113 may be a common electrode.

The display panel 110 may further include a quantum dot color filter 120. The quantum dot color filter 120 may convert incident light of a predetermined color into light of another color and then output the converted light, or may output the incident light of the predetermined color as it is. When blue light is incident, the quantum dot color filter 120 may transmit the blue light to emit the blue light as it is, or may convert the blue light into red light or green light and then emit the red light or the green light. The display panel 110 may emit light of various colors to the outside by the quantum dot color filter 120, and accordingly, the display apparatus 1 may display a screen of various colors.

In another aspect, the quantum dot color filter 120 may include a quantum dot conversion portion 121 and a light transmitting portion 122.

The light source 134 may output blue light. The blue light may pass through the quantum dot sheet 127 to be converted into white light having a high proportion of blue light. The white light passed through the quantum dot sheet 127 may be incident onto the quantum dot conversion portion 121 or the light transmitting portion 122 of the quantum dot color filter 120 of the display panel 110.

The light source 134 may generate light of an intensity or brightness corresponding to power applied from the outside to provide the light to the quantum dot conversion portion 121 and the light transmitting portion 122. Light generated from the light source 134 may be reflected by a separate reflector (not shown) or an aperture (not shown) to be irradiated toward the quantum dot conversion portion 121 and the light transmitting portion 122, as necessary.

A part of the white light incident on the quantum dot conversion portion 121 may be converted into red light or green light and then emitted to the outside. The white light incident on the light transmitting portion 122 may be scattered by the light transmitting portion 122 and then emitted to the outside.

The quantum dot conversion portion 121 may output light of another color by converting the color of light emitted from the light source 134 using quantum dots (QD). For example, the quantum dot conversion portion 121 may convert a part of incident white light into red or green light, and emit the converted light to the outside.

Specifically, the quantum dot conversion portion 121 may include a red light quantum dot element 121r and a green light quantum dot element 121g. The quantum dot conversion portion 121 may include at least one red light quantum dot element 121r and at least one green light quantum dot element 121g, respectively.

The red light quantum dot element 121r may emit red light according to the quantum isolation effect when white light is incident thereto. The red light quantum dot element 121r may include a plurality of quantum dots, and the quantum dots in the red light quantum dot element 121r may be relatively larger than quantum dots in the green light quantum dot element 121g.

Specifically, blue light in white light components incident onto the red light quantum dot element 121r may be converted into red light. The converted red light may be incident onto an absorption type color filter 126 together with red light and green light in the incident white light. Accordingly, the display apparatus 1 according to an embodiment of the present disclosure may have higher brightness than a conventional display apparatus in which only blue light is generated from a light source, passes through a quantum dot color filter, and then is converted into red light. A major part of the light passed through the red light quantum dot element 121r may be red light, and the light may include unconverted green light.

The green light quantum dot element 121g may emit green light having a relatively long wavelength when white light is incident thereto. The green light quantum dot element 121g may include a plurality of quantum dots, and the quantum dots of the green light quantum dot element 121g may be relatively smaller than the quantum dots in the red light quantum dot element 121r.

Specifically, blue light in white light components incident onto the green light quantum dot element 121g may be converted into green light. The converted green light may be incident onto the absorption type color filter 126 together with green light and red light in the incident white light. Accordingly, the display apparatus 1 according to an embodiment of the present disclosure may have higher brightness than the conventional display apparatus in which only blue light is generated from the light source, passes through a quantum dot color filter, and then is converted into green light. A major part of the light passed through the green light quantum dot element 121g may be green light, and the light may include unconverted red light.

The light transmitting portion 122 may transmit and emit white light incident thereon after passing through the quantum dot sheet 127, without converting the color of the white light. Accordingly, when white light is incident on the light transmitting portion 122, the light transmitting portion 122 may emit the white light as it is. That is, light passed through the light transmitting portion 122 may be white light having a high proportion of blue light, like light passed through the quantum dot sheet 127.

The light transmitting portion 122 may be implemented in the form of a white diffuser.

The absorption type color filter 126 may be disposed in front of the quantum dot color filter 120. Light passed through the quantum dot color filter 120 may be incident on the absorption type color filter 126. The absorption type color filter 126 may filter light of the wavelength bands of individual colors from the incident light, and transmit the filtered light. The absorption type color filter 126 may include a red filter 126r, a green filter 126g, and a blue filter 126b.

The light passed through the red light quantum dot element 121r may be incident onto the red filter 126r. The red filter 126r may pass red light in the incident light, while blocking the other light except for the red light. That is, red light in the light incident onto the red filter 126r may pass through the red filter 126r, and green light in the incident light may be blocked by the red filter 126r.

The light passed through the green light quantum dot element 121g may be incident on the green filter 126g. The green filter 126g may pass green light in the incident light, while blocking the other light except for the green light in the incident light. That is, green light in the light incident onto the green filter 126g may pass through the green filter 126g, and red light in the incident light may be blocked by the green filter 126g.

The light passed through the light transmitting portion 122 may be incident onto the blue filter 126b. The blue filter 126b may pass blue light in the incident light, while blocking the other light except for the blue light in the incident light. That is, blue light in light incident onto the blue filter 126b may pass through the blue filter 126b, and red light and green light in the incident light may be blocked by the blue filter 126b.

As such, in the display apparatus 1 according to the embodiment of the present disclosure, since light incident onto the quantum dot color filter 120 is white light, the brightness of the display apparatus 1 may increase. In other words, since blue light output from the light source 134 is converted into white light having a high proportion of blue light by passing through the quantum dot sheet 127, blue light in the white light is converted into red light or green light by the quantum dot color filter 120 to be incident onto the absorption type color filter 126 together with red light or green light included in the incident white light, and the absorption type color filter 126 blocks the other light except for light of the wavelength bands of individual colors in the incident light, the display apparatus 1 may improve the overall brightness. That is, since the display apparatus 1 combines light converted by the quantum dot color filter 120 with light emitted from the quantum dot sheet 127 to provide the combined light, the display apparatus 1 may increase the brightness.

The quantum dot color filter 120 and the absorption type color filter 126 may be disposed between the front polarizing filter 111 and a second substrate 112.

The display panel 110 may further include the second substrate 112. The second substrate 112 may be disposed on the quantum dot color filter 120. The second substrate 112 may be formed of a transparent material to transmit red light, green light, and blue light emitted from the quantum dot color filter 120. For example, the second substrate 112 may be formed of a synthetic resin such as an acrylic resin, glass, or the like.

The display panel 110 may further include a front polarizing filter 111. The front polarizing filter 111 may be disposed on the second electrode 113 so as to polarize incident light. Light transmitted through the second electrode 113 may be incident onto the front polarizing filter 111, and may pass through the front polarizing filter 111 or be blocked by the front polarizing filter 111 according to a vibration direction of the light.

The polarization axis of the front polarizing filter 111 may be orthogonal to the polarization axis of the rear polarizing filter 117. Accordingly, when the rear polarizing filter 117 is a vertical polarizing filter, the front polarizing filter 111 may be a horizontal polarizing filter.

When the polarization axis of the first polarizing filter 111 is orthogonal to the polarization axis of the rear polarizing filter 117, and the liquid crystal molecules of the panel liquid crystal layer 114 are aligned in a line to transmit light passed through the rear polarizing filter 117, the vibrating direction of light transmitted through the rear polarizing filter 117 may not change so that the light may not pass through the front polarizing filter 111. Therefore, light transmitted through the second electrode 113 may be not emitted to the outside. On the other hand, when the liquid crystal molecules of the panel liquid crystal layer 114 are spirally aligned to transmit light passing through the rear polarizing filter 117, the vibrating direction of light transmitted through the rear polarizing filter 117 may change so that the light may pass through the front polarizing filter 111. Therefore, the light transmitted through the second electrode 113 may be emitted to the outside.

At least one of red light, green light and blue light may be combined with other light or not combined with other light when being emitted to the outside to thereby form a predetermined color. The display apparatus 1 may display a predetermined image by using at least one of red light, green light, and blue light.

Figure 4:
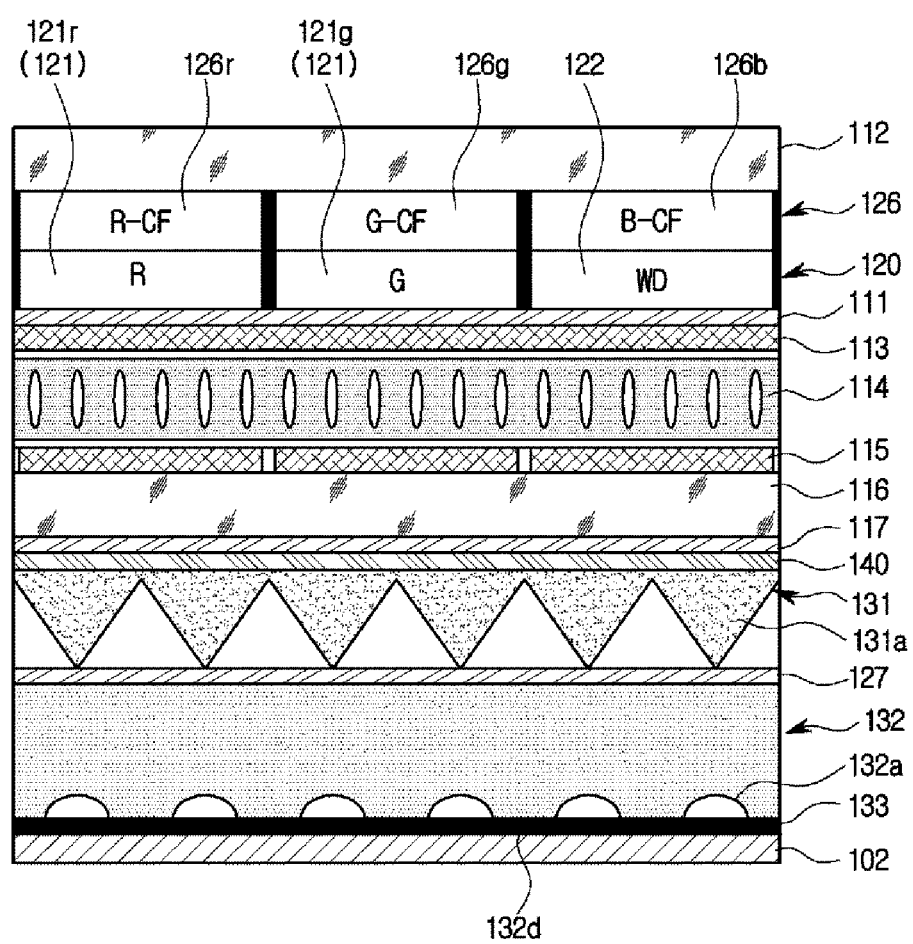
FIG. 4 is a cross-sectional view of a display apparatus according to another embodiment.

FIG. 4 is a cross-sectional view of a display apparatus according to another embodiment. Hereinafter, descriptions overlapping with those described above with reference to FIGS. 2 and 3 will be omitted. In FIG. 4, reference numeral 2 refers to a display apparatus according to another embodiment.

As shown in FIG. 4, the display apparatus 2 may further include a reflective polarizer 140. The reflective polarizer 140 may enhance the brightness of light emitted from the light source 134. The reflective polarizer 140 may be disposed between the rear polarizing filter 117 and the prism sheet 131. As an example, the reflective polarizer 140 may be a Dual Brightness Enhancement Film (DBEF) sheet.

Figure 5:
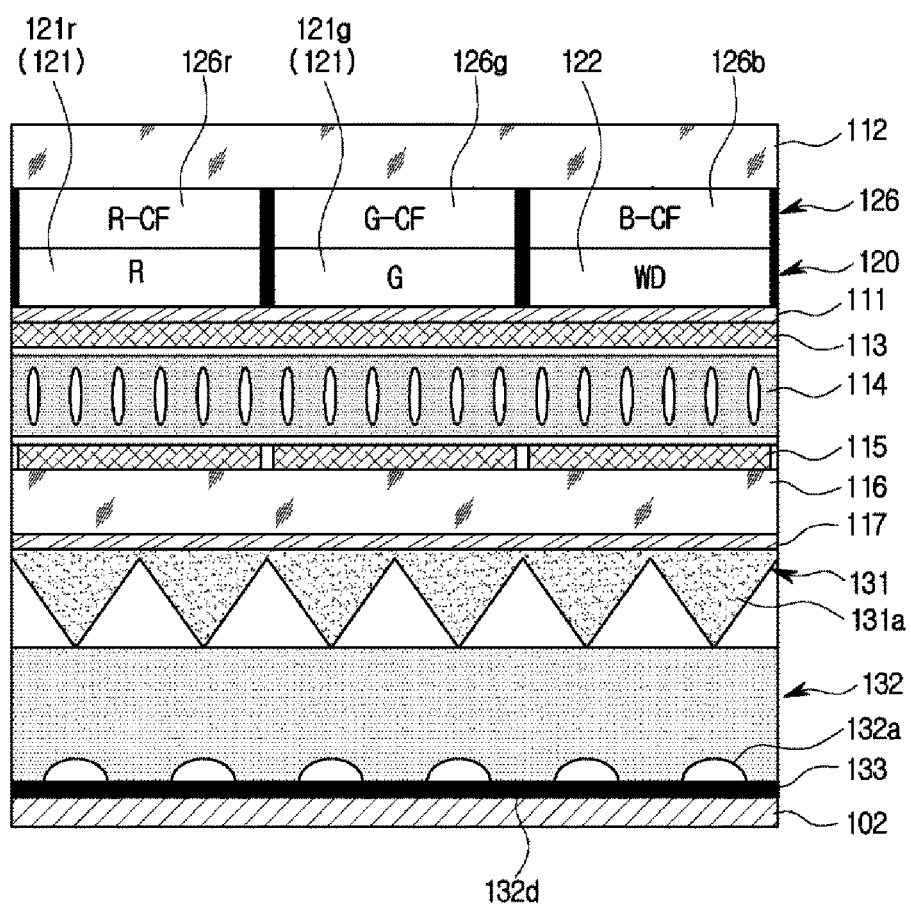
FIG. 5 is a cross-sectional view of a display apparatus according to another embodiment.

FIG. 5 is a cross-sectional view of a display apparatus according to another embodiment. Hereinafter, descriptions overlapping with those described above with reference to FIGS. 2 and 3 will be omitted. In FIG. 5, reference numeral 3 refers to a display apparatus according to another embodiment.

As shown in FIG. 5, the display apparatus 3 may be configured such that the quantum dot sheet is omitted, and the light source 134 outputs white light. That is, the light source 134 of the display apparatus 3 may supply the display panel 110 with white light having a high proportion of blue light. As described above, the light source 134 may be disposed on at least one side of a plurality of longer sides and a plurality of shorter sides of the display panel 110 (edge type), or the light source 134 may be disposed immediately below the display panel 110 (direct type). By omitting the quantum dot sheet, the display apparatus 3 may be reduced in thickness.

Figure 6:
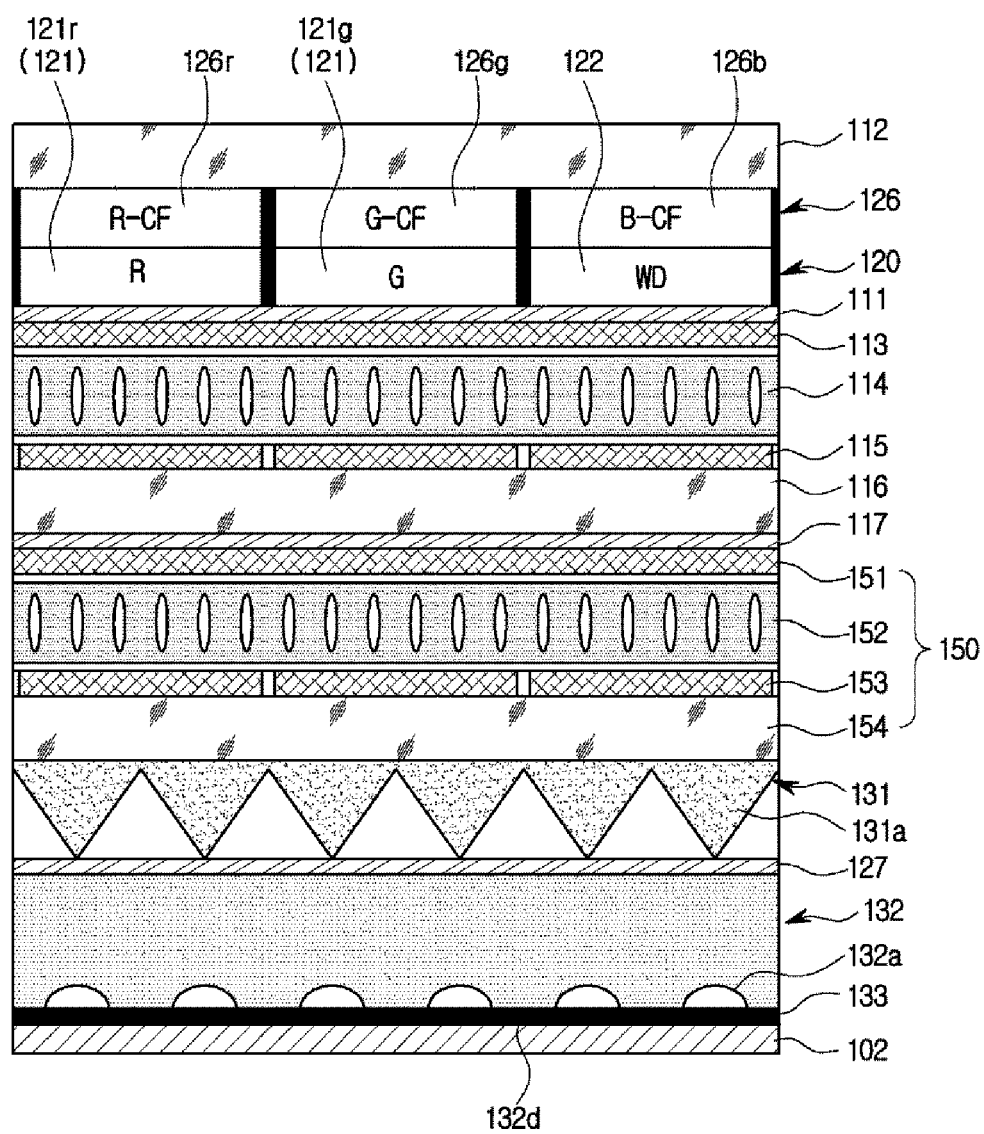
FIG. 6 is a cross-sectional view of a display apparatus according to another embodiment.

FIG. 6 is a cross-sectional view of a display apparatus according to another embodiment. Hereinafter, descriptions overlapping with those described above with reference to FIGS. 2 and 3 will be omitted. In FIG. 6, reference numeral 4 refers to a display apparatus according to another embodiment.

As shown in FIG. 6, the display apparatus 4 may include an optical shutter 150. The optical shutter 150 may improve the contrast ratio of the display apparatus 4. The optical shutter 150 may include a shutter polarizing filter 154, a first shutter substrate 153, a shutter liquid crystal layer 152, and a second shutter substrate 151.

The shutter polarizing filter 154 may polarize light emitted from the light source 134 and incident onto the first shutter substrate 153 to cause only light vibrating in the same direction as a predetermined polarization axis to enter the first shutter substrate 153. One surface of the shutter polarizing filter 154 may be in contact with the first shutter substrate 153. Alternatively, the shutter polarizing filter 154 may be disposed adjacent to the first shutter substrate 153. The shutter polarizing filter 154 may be implemented in the form of a film. As an example, the shutter polarizing filter 154 may be a vertical polarizing filter or a horizontal polarizing filter.

The first shutter substrate 153 may be disposed on the shutter polarizing filter 154. A first shutter electrode (not shown) may be disposed on one surface of the first shutter substrate 153. Specifically, the first shutter electrode may be disposed on one surface of the first shutter substrate 153 facing the shutter liquid crystal layer 152. The first shutter substrate 153 may be formed of a transparent material to transmit light passed through the shutter polarizing filter 154. As an example, the first shutter substrate 153 may be formed using a synthetic resin such as acryl or glass. In addition, the first shutter substrate 153 may be implemented in the form of a flexible printed circuit board (FPCB).

The first shutter electrode may apply a current to the shutter liquid crystal layer 152 together with a second shutter electrode (not shown) which will be described later to adjust the arrangement of liquid crystal molecules in the shutter liquid crystal layer 152. The display panel 110 may output various images according to the arrangement of the liquid crystal molecules.

The first shutter electrode may be implemented using a thin film transistor (TFT). The first shutter electrode may be connected to an external power source to receive power. The first shutter substrate 153 may be provided with a plurality of first shutter electrodes.

The shutter liquid crystal layer 152 may display images using a liquid crystal that exhibits optical properties according to changes in voltage and temperature. The shutter liquid crystal layer 152 may be disposed between the first shutter electrode and the second shutter electrode, and may include a plurality of liquid crystal molecules. The liquid crystal molecules may be arranged in a plurality of rows in the shutter liquid crystal layer 152. The liquid crystal molecules may be arranged in a line in a predetermined direction or spirally twisted according to an electric field.

The second shutter substrate 151 may be disposed on the shutter liquid crystal layer 152. The second shutter substrate 151 may be made of a transparent material to transmit white light emitted from the quantum dot sheet 127. As an example, the second shutter substrate 151 may be formed of a synthetic resin such as acryl, glass, or the like.

The second shutter electrode may be disposed on the second shutter substrate 151. The second shutter electrode may face the first shutter electrode with the shutter liquid crystal layer 152 in between. The second shutter electrode may apply a current to the shutter liquid crystal layer 152 together with the first shutter electrode. The second shutter electrode may be a common electrode.

As the display apparatus 4 shown in FIG. 6 includes the optical shutter 150, white light passed through the quantum dot sheet 127 may pass through the optical shutter 150 to further improve the contrast ratio.

Figure 7:
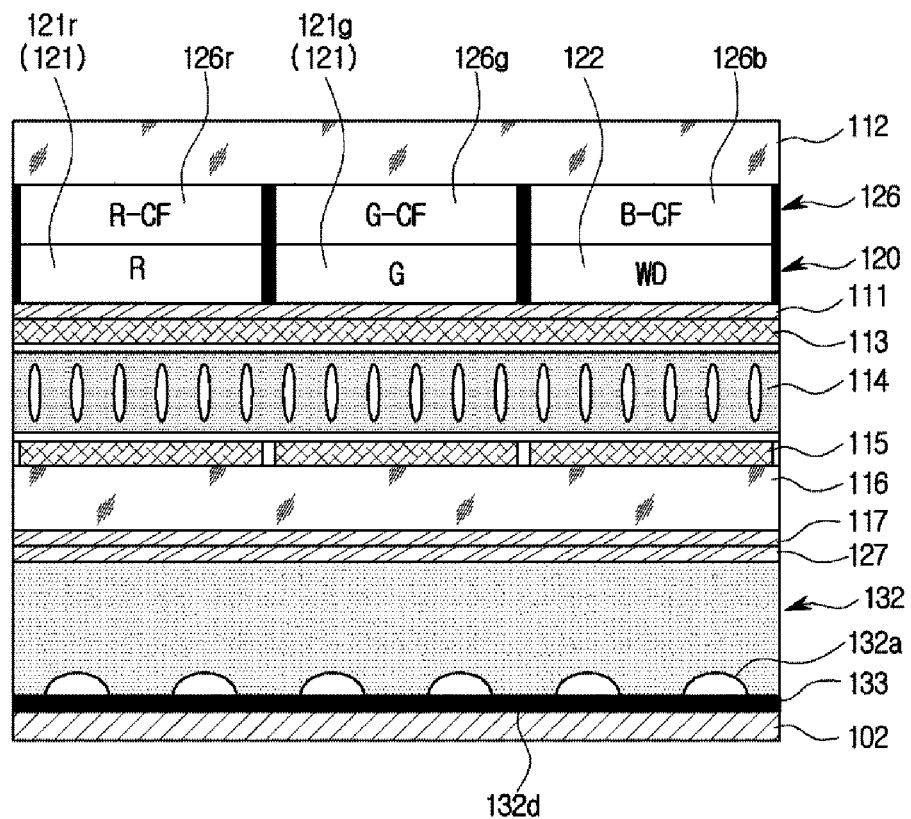
FIG. 7 is a cross-sectional view of a display apparatus according to another embodiment.

FIG. 7 is a cross-sectional view of a display apparatus according to another embodiment. Hereinafter, descriptions overlapping with those described above with reference to FIGS. 2 and 3 will be omitted. In FIG. 7, reference numeral 5 refers to a display apparatus according to another embodiment.

As shown in FIG. 7, the prism sheet 132 of the display apparatus 5 may be omitted. When the prism sheet 132 is omitted, the display apparatus 5 may be reduced in thickness.

Figure 8:
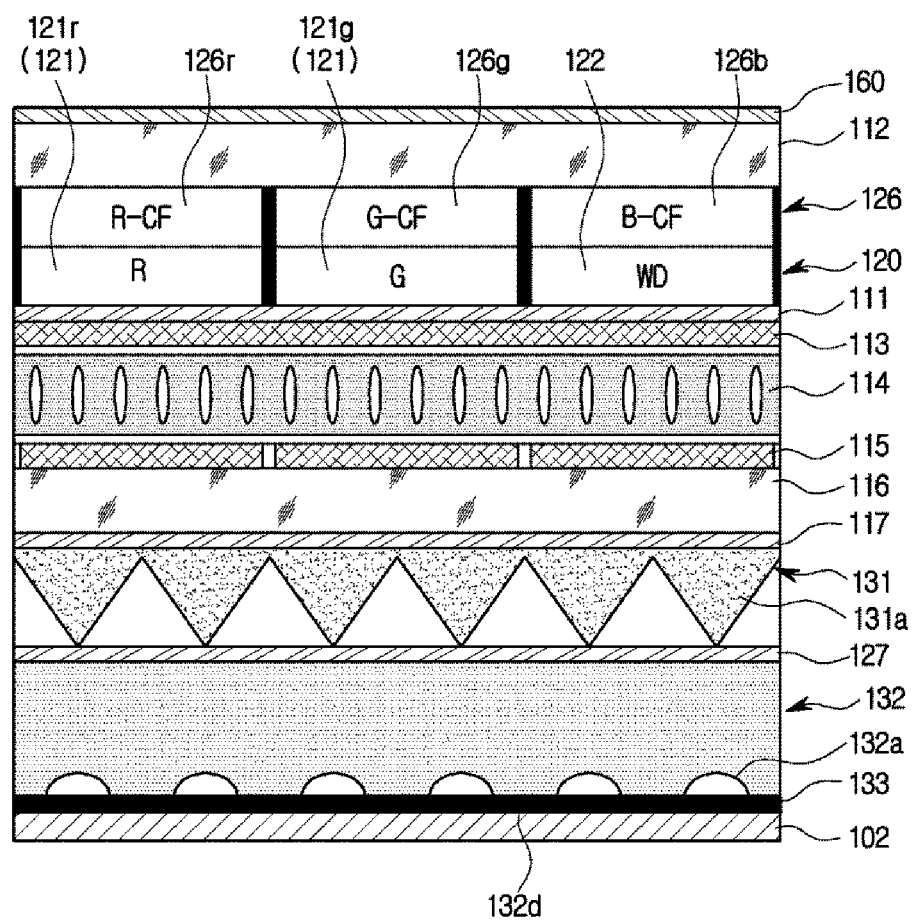
FIG. 8 is a cross-sectional view of a display apparatus according to another embodiment.

FIG. 8 is a cross-sectional view of a display apparatus according to another embodiment. Hereinafter, descriptions overlapping with those described above with reference to FIGS. 2 and 3 will be omitted. In FIG. 8, reference numeral 6 refers to a display apparatus according to another embodiment.

As shown in FIG. 8, the display apparatus 6 may include a surface treatment layer 160 disposed in front of the second substrate 112. The surface treatment layer 160 may be an ultra-low reflection film for reducing surface reflection due to outside light. The surface treatment layer 160 may be an anti-glare film for preventing a viewer from being dazzled.

Although a few embodiments of the present disclosure have been shown and described, it would be appreciated by those skilled in the art that changes may be made in these embodiments without departing from the principles and spirit of the disclosure, the scope of which is defined in the claims and their equivalents.

The invention claimed is:

1. A display apparatus comprising:
a display panel having a quantum dot color filter and an absorption type color filter disposed in front of the quantum dot color filter;
a backlight unit configured to supply light to the display panel;
a quantum dot sheet disposed between the display panel and the backlight unit; and
an optical shutter disposed between the display panel and the quantum dot sheet and configured to improve a contrast ratio.

2. The display apparatus according to claim 1, wherein the backlight unit comprises a light source configured to emit blue light.

3. The display apparatus according to claim 1, further comprising a prism sheet disposed in front of the quantum dot sheet and configured to enhance a degree of light condensation of light emitted from the quantum dot sheet.

4. The display apparatus according to claim 1, further comprising a reflective polarizing member disposed between the display panel and the quantum dot sheet.

5. The display apparatus according to claim 1, wherein the optical shutter comprises:
a shutter polarizing filter disposed adjacent to the quantum dot sheet;
a first shutter substrate disposed in front of the shutter polarizing filter;
a shutter liquid crystal layer disposed in front of the first shutter substrate; and
a second shutter substrate disposed in front of the shutter liquid crystal layer.

6. The display apparatus according to claim 1, further comprising a surface treatment layer disposed in front of the absorption type color filter and configured to reduce surface reflection due to outside light.

7. The display apparatus according to claim 1, wherein the display panel comprises a panel liquid crystal layer and a front polarizing filter disposed in front of the panel liquid crystal layer, and
the quantum dot color filter is in contact with a front surface of the front polarizing filter.

8. The display apparatus according to claim 1, wherein the backlight unit comprises:
a light source;
a light guide plate configured to guide light generated from the light source toward the display panel; and
a reflection sheet disposed behind the light guide plate.

9. The display apparatus according to claim 1, wherein the quantum dot sheet is configured to emit a red light, a green light, and a blue light, and
light emitted from the quantum dot sheet comprises a higher proportion of the blue light with respect to the red light and the green light.

10. A display apparatus comprising:
a display panel having a quantum dot color filter and an absorption type color filter disposed in front of the quantum dot color filter;
a backlight unit having a light source configured to output white light; and
an optical shutter disposed between the display panel and the backlight unit and configured to improve a contrast ratio,
wherein the white light has a high proportion of blue light.

11. The display apparatus according to claim 10, wherein the optical shutter comprises:
a shutter polarizing filter disposed adjacent to the backlight unit;
a first shutter substrate disposed in front of the shutter polarizing filter;
a shutter liquid crystal layer disposed in front of the first shutter substrate; and
a second shutter substrate disposed in front of the shutter liquid crystal layer.

12. The display apparatus according to claim 10, further comprising a prism sheet disposed in front of the backlight unit and configured to enhance a degree of light condensation of light emitted from the backlight unit.

13. The display apparatus according to claim 10, further comprising a reflective polarizing member disposed between the display panel and the backlight unit.

* * * * *